United States Patent [19]

Kurtz et al.

[11] Patent Number: 5,008,056

[45] Date of Patent: Apr. 16, 1991

[54] REDUCTION IN DIE DROOL IN FILLED RESINS AND PRODUCT IMPROVEMENT

[75] Inventors: Stuart J. Kurtz, Martinsville, N.J.; Steve R. Szaniszlo, Laval, Canada

[73] Assignee: Union Carbide Chemicals and Plastics Technology Corporation, Danbury, Conn.

[21] Appl. No.: 454,458

[22] Filed: Dec. 21, 1989

Related U.S. Application Data

[63] Continuation-in-part of Ser. No. 249,778, Sep. 26, 1988, abandoned.

[51] Int. Cl.$^5$ .............................................. B29C 47/12
[52] U.S. Cl. .................................. 264/130; 264/131; 264/169; 264/174; 264/211; 425/113; 425/461; 425/467; 427/195
[58] Field of Search ............... 264/169, 174, 176.1, 264/40.6, 127, 211, 130, 131; 425/461, 467, 466, 113; 427/195

[56] References Cited

U.S. PATENT DOCUMENTS

| | | | |
|---|---|---|---|
| 2,403,476 | 7/1946 | Berry et al. | 264/169 |
| 2,691,814 | 10/1954 | Tait | 264/127 |
| 2,960,482 | 11/1960 | Henning | 264/169 |
| 3,094,585 | 6/1963 | Rudner | 264/127 |
| 3,446,884 | 5/1969 | Miller et al. | 264/209.4 |
| 3,942,937 | 3/1976 | Prober et al. | 264/169 |
| 4,167,386 | 9/1979 | Mallay | 425/467 |
| 4,264,294 | 4/1981 | Ruiz | 425/467 |
| 4,484,883 | 11/1984 | Honda et al. | 264/40.6 |
| 4,615,858 | 10/1986 | Su | 264/40.6 |

FOREIGN PATENT DOCUMENTS

| | | | |
|---|---|---|---|
| 52-25450 | 7/1977 | Japan | 425/461 |
| 55-21222 | 2/1980 | Japan | 425/461 |
| 58-12743 | 1/1983 | Japan | 425/461 |

*Primary Examiner*—Jeffery Thurlow
*Attorney, Agent, or Firm*—Clement J. Vicari

[57] ABSTRACT

A process for reducing die drool during extrusion of highly filled polymeric resins for production of jacketing insulation for wire and cable by incorporating into the surface of the die in contact with said resin a compound which decreases the adhesiveness between the polymeric resin and the die surface, said compound being employed in an amount sufficient to reduce die drool.

3 Claims, No Drawings

REDUCTION IN DIE DROOL IN FILLED RESINS AND PRODUCT IMPROVEMENT

This application is a continuation in-part of application Ser. No. 249,778, filed on Sept. 26, 1988 now abandoned.

TECHNICAL FIELD

The present invention relates to an extrusion process and, more particularly, to a process for extruding highly filled polymeric compositions for jacketing insulation used in wire and cable products and which exhibit die drool during extrusion.

BACKGROUND ART

As used herein, the term "die drool" means the accumulation of polymeric or mostly polymeric material at the external die surface adjacent to the polymer exiting the die. Such build-up causes the surface of the polymer composition exiting the die to have increased roughness. Portions of the material build-up may re-attach itself to the extrudate causing upsets or poor product. The phenomenon is also described in the publication entitled, "Die Drool—What Causes It; How to Avoid It" by Imrich Klein from "Plastics World"—May, 1981.

The term "filled polymeric resin" means any solid additives which are incorporated in the resin prior to extrusion. These can include carbon black, calcium carbonate, silica, hydrated aluminum and other additives normally added in the production of jacketing insulation for wire and cable products.

The term "highly filled polymeric resin" differentiates polymer systems of low volumetric loading from those of high volumetric loading. In particular, high volumetric loading of fillers are associated with a marked decrease in extensibility of the molten polymer system. Extensibility is the strain at break under a defined rate of extension and temperature. The strain can be estimated in an engineering measure as $L/L_0$, where L is the length at break and $L_0$ is the initial length of the deforming section. In general, the volumetric loading of a highly filled polymer system is greater than 10%, preferably greater than 15% to as high as 40% for most thermoplastic systems. The purpose of working at such high levels is to incorporate the properties of the filler into the polymeric system. One such purpose is to obtain flame retardancy not normally found in the polymer resin. Another reason may be to increase the modulus or toughness of the polymer resin. An economic reason may be to simply decrease cost at little or no loss in properties.

The use of the measure, "a marked decrease in extensibility of the molten polymer system" can be used as a relevant working definition of high loadings. This allows one to separate the specific mechanism of die drool associated with high filler loadings independent of the type of filler used. A simple test is to stretch the filled molten polymer at rates and at temperatures corresponding to the particular extrusion operation of concern. If the strain at break is less than about 3 or 4, then the material is relatively brittle compared to lower filler loadings which would yield a ductile response and not fail at strains less than about 10.

DESCRIPTION OF THE PRIOR ART

The problem of die drool and die lip buildup during extrusion of highly filled polymeric resins for production of jacketing insulation used in the wire and cable industry is recognized as a chronic problem that is costing manufacturers losses in production and scrap amounting to several million dollars per year. This problem has only been looked at in the context of severe or acute incidents of die lip buildup and not as a chronic problem. As such, the problem remains at a sub-acute stage and has not received much attention in the art.

The phenomenon of die lip buildup appears to be related to several different problems. Suggested causes have been described as the presence of low molecular weight polymer species, the presence of volatiles including moisture content, the presence of a high degree of solid particle loading, and the type of die geometry including entry and exit angles. In addition, the presence of particular species such as zinc stearate, talc, and fatty acids, wetting and dispersion of pigments, take-off conditions (drawdown and take-off rates), amount of die swell and/or the rate of die swell, and atmospheric conditions all have been suggested as "causes". Each of these causes actually constitute observations and correlations as opposed to an understanding of the mechanism of die drool. Currently, there is no satisfactory theory or critical experiment which would shed some light on the mechanism or mechanisms of die drool.

At present, the art is aware of several current practices which are alleged to reduce or eliminate die drool. The practice of drying the resin, especially for carbon filled polyethylene, appears to reduce die drool. It is thought that the presence of moisture contributes to the problem of die buildup. Another approach is to use additives such as Viton A which is a fluoroelastomer available from DuPont Chemical Company which essentially works similarly to the competitive fluoroelastomer resins of other producers. It is known that Viton A will reduce sharkskin melt fracture and that it is thermodynamically incompatible in polyethylene and migrates to the surface of the die, most likely coating the die with a thin layer. Unfortunately, the Viton A layer is only temporarily attached by its physical proximity to the wall and will wash away with subsequent extrusion if one does not continuously feed at least a fraction of the material having Viton A. In the case of highly filled resins, this thin layer may never actually build up to affect die drool because the filler immediately abraids this temporary layer.

Another approach is to utilize a die with roughened internal surfaces. However, only minor improvements in die drool have been observed. The art has also resorted to the use of water spray on die surfaces to eliminate the problem of die lip buildup. See for example "Wire Journal International", May, 1982, p. 62, in an article by M. L. Itzkoff and G. L. Woodell on "Crosslinkable polyethylene for wire and cable: an update" who show the use of "Circulation of hot water around the die" to make extrusion easier and to "reduce Polymer buildup (drooling)."

In the course of investigating the possible mechanisms of die drool it was discovered that die drool will arise if and only if material from the polymer stream separates from the main stream and adheres to the die surface. It is believed that this separation occurs inside the die and this will be affected by the surface properties of the die, the incompatibility of components to the main stream forming separate layers close to the die surface, and the limiting rheological properties of the material such as strain at break under stretching and shearing flows. The fracture or breaking strain is very low for highly filled resins, especially where the film is not strongly bonded to the molten polymer matrix. Under exit stretching and die wall shearing such materials may actually cause fracture locally and thus would constitute potential material to the "die drool". Thus it was concluded that any mechanical or chemical action which reduces the adherence to the front and especially to the inside surface of the die and subsequently to reduce the stretching or shearing adjacent to the die wall and front surface will thus moderate or eliminate build-up.

Under normal extrusion conditions, polymer extrusion is accompanied by some degree of die cool often after days and in some case not appearing until after months of operation. The possible build up of such resin over long periods of time may result in the burning of the resin as decribed by Honda in U.S. Pat. No.4,484,883 and resolving the problem in multilayer dies by special heating and cooling devices and by adding on the surface a eutectoid of fluorine-containing compound. Other approaches to achieving smooth surfaces on polymer extrudates include the use of specially treated surfaces with polysiloxane fluids as in Prober, U.S. Pat. No. 3,942,937 and Berry, U.S. Pat. No. 2,403,476 which employs a coating of polytetrafluoethylene. In each of these cases, the mechanism of build up as decribed is a soft sticky resin adhearing in a continuous manner to the front surface of the die. It is the pulling process which is described as intermittent. As described by Prober, P-1, 1-12 t 20, the process is one of adhesion of the semitacky thermoplastic material which is subsequently pulled due to its transient or intermittent adherence causing protrusions or marring of the polymer extrudate surfaces. Berry notes that it is sufficient to coat only the external surface with a tetrafluoethylene polymer to prevent the adhesion problem. Each of these approaches to solving the die drool problem or similar problems are valid for materials which have the slow accumulation which can be satisfied by the external surface coating.

In contrast to the application to materials which don't form die drool until the sticking at the external surface, one is faced with a type of material which separates inside and at the exist of the die from the extrudate melt stream in what best may be described as a brittle failure. Indeed, highly filled polymer systems show a very different mechanism of die drool from the mechanisms described above. Because of this difference, external coating of the die is insufficient. Grease covered die surfaces still do not prevent die drool in highly filled polymer systems. In the present invention it is shown that the application of special embedded coatings inside and at the die exit are sufficient to prevent die drool specifically for these highly filled systems.

In addition, because in order to prevent die drool in highly filled systems, one has to contend with a major problem known to fabricators and suppliers alike, that of wear during extrusion. For this reason, it is unacceptable in practice to use coating technologies which are not long lasting. Thus one would avoid coating of fluopolymers or polysiloxanes onto the die surface and instead and according to the present invention, an impregnated coating known for its very high resistence to wear against highly filled polymer systems is used.

SUMMARY OF THE INVENTION

Broadly contemplated, the present invention provides a process for reducing die drool during extrusion of highly filled polymeric resins and preferably polyolefin resins for production of jacketing insulation for wire and cable which comprises incorporating into and not onto the surface of the die in contact with said resin a compound which decreases the adhesiveness between the polymeric resin and the die surface, said compound being employed in an amount sufficient to reduce die drool.

DESCRIPTION OF THE PREFERRED EMBODIMENTS

The polyolefins which can be employed in the process of the present invention are conventional materials and include high pressure, low density polyethylene, and linear low pressure low density, medium density, and high density polyethylene and copolymers thereof.

The fillers normally added to the compositions are those which are conventional in the art and include talc, antimony oxide, zinc stearate, aluminum trihydrate, calcium carbonate, silica, carbon black, diatomaceous earth, halogenated flame retardant, magnesium hydroxide and the like.

The compound or compounds which can be incorporated into the surface of the die in contact with the resin is any compound which decreases the adhesion between the resin and the die surface. The material of choice is a fluorinated hydrocarbon polymer. Preferably the fluorinated hydrocarbon is anchored by chemical treatment or physical incorporation.

One such process resulting in a slippery surface (the coefficient of friction is 0.08) is a proprietary process called Nedox ®SF-2 of the company, General Magnaplate, of Linden, N.J. In the specific coating applied to the dies of the examples herein, a cleaned steel surface was electroplated with a nickel alloy forming a porous layer. The pores were subsequently enlarged and then infused with sub-micron sized particles of fluorocarbon polymers. The part is heat treated to create a smooth, slippery surface with a hardness of up to RC 65 and low wear (Tabor abrasion=31 mg). The total construction is now part of the die. Other processes which create a new slippery long life surface having surface properties similar to Nedox would also be successful.

EXAMPLES

The following examples will further illustrate the invention. In the examples, die drool was determined by the percentage of die surface radius at the die exit covered by the die drool. Measurements were made utilizing inscribed lines in the die surface, each line representing a 25% buildup based on the diameter of the die. The extruder utilized was a 2½ inch Davis Standard extruder having a barrel length to diameter ratio of 24 to 1. The extruder was fitted with a metering screw of 3 to 1 compression ratio having a final metering section of 10 turns at a depth of 0.11 inches. The crosshead was a compensating flow type and a combination 20-40-60-20 mesh screen pack was used with a breaker plate. The extruder had five heating zones on the barrel with separate heaters on the crosshead and die. The die utilized was a converging die with an exit diameter of 0.125 mils, an entry diameter of 1.014 inches and a length of 1.125 inches. The die was fabricated from standard tool steel.

EXAMPLE I

Example 1 demonstrates the occurrence of die drool under conventional procedures. The die and extruder employed was as described previously. Table I describes the extruder conditions. The base resin extruded was a polyethylene copolymer containing 45% by weight filler, equivalent to about 21% by volume, comprised primarily of talc, with lesser amounts of antimony oxide, zinc stearate, a cross-linking agent (which is not activated until after extrusion) and a halogenated compound. This material is a flame retardant cable insulation material and is described in U.S. Pat. No. 4,243,579. The extruder RPM was 32 and a wire line speed of 300 feet/min. was employed. The coating was placed on a 14 A.W.G. copper conductor with a resulting 0.030 inch wall thickness. The compound melt temperature was 130° C. The run was continued until die drool covered 25% of the die surface which occurred at 2,640 running feet. The product had various uneven deposits of resin along its length.

TABLE I

| Extruder Temperature Profile (°C.) | | | | | |
|---|---|---|---|---|---|
| Barrel | 110° | 110° | 110° | 104° | 99° |
| Crosshead | 110° | | | | |
| Die | 110° | | | | |
| Stock | 130° | | | | |
| O. D. of Die | 0.125" | | | | |
| I. D. (Wire) | 0.064" | | | | |
| Wire Line Speed 300 feet/min. | | | | | |

EXAMPLE II

In the following Example II the same resin was utilized in substantially the same equipment and conditions except that the surface of the die in contact with the resin had incorporated therein a fluorocarbon impregnated metal matrix bonded to the die. The fluorocarbon impregnated metal matrix is available from General Magnaplate, Inc. under the trade name "Nedox". Three runs were made under the same conditions as in Example 1, each run having a duration and percent die drool build-up as follows:

| Run 1 | 7,500 feet | 5 |
|---|---|---|
| Run 2 | 5,100 feet | 13 |
| Run 3 | 9,000 feet | 5 |

In each of these runs the die drool never built up to the 25% level of the uncoated die. The amount of material by area build-up was generally only a few percent of the uncoated die for runs which were 3 to 4 times longer.

EXAMPLE III

In this Example, the same conditions and equipment were utilized as in Example I, except that the filled polyethylene resin was dried for 18 hours at 70° C. prior to extrusion and a different crosslinking agent was used. As a result 25% die drool on the die surface did not occur until 4500 ft of cable was produced, showing an improvement with drying.

EXAMPLE IV

In this Example, the same material as in Example III was utilized i.e., the polyethylene resin was dried for 18 hours at 70° C. prior to extrusion. However, in this Example, the coating of Example II was applied to the die and the same conditions and equipment of Examples I and II were employed.

As a result, die drool of 25% did not occur until 18,000 ft was produced.

EXAMPLE V

In this Example, the same materials, conditions and equipment of Example II was utilized for three runs except that the line speeds were varied. The results are as follows:

| Line Speed FPM | Die Drool, Ft | % Die Drool |
|---|---|---|
| 300 | 9000+ | 5 |
| 400 | 9000+ | <2 |
| 500 | 19,500+ | <2 |

This example demonstrates that the low amount of die drool build-up is maintained even at higher line speeds.

EXAMPLE VI

This example utilized the same material as Example III, i.e., the polyethylene resin was dried for 18 hours at 70° C. prior to extrusion. However, in this example in order to improve adhesion of the polymer melt to the die walls the die was fabricated from brass (as disclosed in U.S. Pat. No. 4,554,120 issued Nov. 19, 1985), and the conditions of Example III were utilized. As a result, die drool of 25% occurred at 3,000 feet, showing no reduction in die drool with improved adhesion of the extruded polyethylene to the die.

EXAMPLE VII

In this example the same conditions, material and equipment of Example VI were utilized, except that 0.1% VITON A as described in U.S Pat. No. 4,581,406 issued Apr. 8, 1986 was incorporated into the filled polyethylene resin by dry blending prior to extrusion. As a result, die drool of 25% occurred at 3,300 feet. This example demonstrates that the addition of VITON A in material with high filler concentration did not reduce the die drool.

What is claimed is:

1. A process for reducing die drool during the die extrusion of highly filled polyolefinic resins for production of jacketing insulators for wire and cable which comprises anchoring into the surface of the die submicron particles of a fluorinated hydrocarbon polymer said anchoring being effected by creating pores in the surface of the die in contact with the polymeric resins and thereafter infusing said pores with said submicron particles of fluorinated hydrocarbon polymer.

2. A process according to claim 1 wherein said polyethylene is a high pressure low density polyethylene, a linear low pressure, low density, medium density and high density polyethylene and copolymers thereof.

3. A process according to claim 1 wherein said filled polyethylene resin includes talc, or antimony oxide, or zinc stearate, or aluminum trihydrate, or calcium carbonate, or silica, or carbon black, or diatomaceous earth or halogenated flame retardant, or magnesium hydroxide or mixtures thereof.

* * * * *